United States Patent
Liu et al.

(10) Patent No.: US 9,917,948 B2
(45) Date of Patent: Mar. 13, 2018

(54) CALL PROCESSING METHOD AND APPARATUS

(71) Applicant: Beijing Zhigu Rui Tuo Tech Co., Ltd, Beijing (CN)

(72) Inventors: Jia Liu, Beijing (CN); Peng Lin, Beijing (CN); Kuifei Yu, Bejing (CN)

(73) Assignee: BEIJING ZHIGU RUI TUO TECH CO., LTD, Beijing (CN)

( * ) Notice: Subject to any disclaimer, the term of this patent is extended or adjusted under 35 U.S.C. 154(b) by 0 days.

(21) Appl. No.: 15/115,658

(22) PCT Filed: Jan. 15, 2015

(86) PCT No.: PCT/CN2015/070753
§ 371 (c)(1),
(2) Date: Jul. 29, 2016

(87) PCT Pub. No.: WO2015/124048
PCT Pub. Date: Aug. 27, 2015

(65) Prior Publication Data
US 2017/0180551 A1    Jun. 22, 2017

(30) Foreign Application Priority Data
Feb. 18, 2014 (CN) .......................... 2014 1 0054291

(51) Int. Cl.
| H04M 1/56 | (2006.01) |
| H04M 15/06 | (2006.01) |
| H04M 3/436 | (2006.01) |
| H04M 3/533 | (2006.01) |
| H04M 3/42 | (2006.01) |

(52) U.S. Cl.
CPC ....... *H04M 3/436* (2013.01); *H04M 3/42042* (2013.01); *H04M 3/533* (2013.01)

(58) Field of Classification Search
None
See application file for complete search history.

(56) References Cited

U.S. PATENT DOCUMENTS

| 6,198,916 B1 | 3/2001 | Martin et al. |
| 6,411,687 B1 * | 6/2002 | Bohacek ................. H04M 3/51 379/201.11 |

(Continued)

FOREIGN PATENT DOCUMENTS

| CN | 1115932 A | 1/1996 |
| CN | 1537381 A | 10/2004 |

(Continued)

OTHER PUBLICATIONS

International Search Report for PCT Application No. PCT/CN2015/070753, dated Apr. 29, 2015, 2 pages.

*Primary Examiner* — Quoc D Tran
(74) *Attorney, Agent, or Firm* — Amin, Turocy & Watson, LLP (57) ABSTRACT

A call processing method and apparatus are provided as a call processing solution. An example method comprises acquiring multimedia data from a calling subscriber before a call ends, where the calling subscriber is a subscriber that initiates the call, determining whether the call satisfies a preset call processing condition according to the multimedia data from the calling subscriber, and processing the call if the call processing condition is satisfied.

27 Claims, 2 Drawing Sheets

(56) References Cited

U.S. PATENT DOCUMENTS

| | | | |
|---|---|---|---|
| 6,697,457 B2 | 2/2004 | Petrushin | |
| 7,489,770 B2 * | 2/2009 | Nemoto | H04M 1/2535 |
| | | | 379/142.01 |
| 8,189,755 B2 * | 5/2012 | Winikoff | H04M 3/436 |
| | | | 379/142.06 |
| 8,285,257 B2 | 10/2012 | Isobe et al. | |
| 8,538,755 B2 | 9/2013 | Bollano et al. | |
| 8,953,762 B1 * | 2/2015 | Guarriello | H04M 3/42161 |
| | | | 379/142.05 |
| 9,088,882 B2 * | 7/2015 | Ferren | |
| 2008/0084975 A1 * | 4/2008 | Schwartz | H04M 3/436 |
| | | | 379/88.22 |
| 2008/0096532 A1 | 4/2008 | Lyle et al. | |
| 2009/0052647 A1 * | 2/2009 | Wood | H04M 3/436 |
| | | | 379/207.02 |
| 2010/0158227 A1 * | 6/2010 | Grandhi | H04M 3/42042 |
| | | | 379/142.17 |
| 2011/0250863 A1 * | 10/2011 | Islam | H04L 12/66 |
| | | | 455/404.1 |
| 2013/0016819 A1 * | 1/2013 | Cheethirala | H04M 1/65 |
| | | | 379/142.05 |
| 2014/0105373 A1 * | 4/2014 | Sharpe | H04M 3/4365 |
| | | | 379/142.05 |
| 2014/0177812 A1 * | 6/2014 | Barrett | H04M 11/04 |
| | | | 379/47 |

FOREIGN PATENT DOCUMENTS

| | | |
|---|---|---|
| CN | 1543615 A | 11/2004 |
| CN | 101273594 A | 9/2008 |
| CN | 103093752 A | 5/2013 |
| CN | 103813031 A | 5/2014 |
| EP | 1125280 B1 | 1/2007 |

* cited by examiner

CALL PROCESSING METHOD AND APPARATUS

RELATED APPLICATION

The present application is a U.S. National Stage filing under 35 U.S.C. § 371 of international patent cooperation treaty (PCT) application No. PCT/CN2015/070753, filed Jan. 15, 2015, and entitled "CALL PROCESSING METHOD AND APPARATUS", which claims the benefit of priority to Chinese Patent Application No. 201410054291.2, filed on Feb. 18, 2014, which applications are hereby incorporated into the present application by reference herein in their respective entireties.

TECHNICAL FIELD

Embodiments of the present application relate to the field of communications technologies, and in particular, to a call processing method and apparatus.

BACKGROUND

During a common phone call, a called party usually decides whether to pick up the phone, that is, answer the call, based on a current situation. If after a period of waiting, the called party still does not pick up, the calling party may access a voice mailbox of the called party to leave the called party a message. After leaving the message, the calling party hangs up and the call ends. The called party may access the voice mailbox to listen to the message, though in this case the called party may have already missed some important calls.

SUMMARY

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the purpose of this summary is to present some concepts related to some exemplary non-limiting embodiments in simplified form as a prelude to more detailed descriptions of the various embodiments that follow in the disclosure.

In view of this, an example objective of embodiments of the present application is to provide a call processing solution.

According to an example aspect of the embodiments of the present application, a call processing method is provided, comprising:

acquiring multimedia data from a calling subscriber before a call ends, where the calling subscriber is a subscriber that initiates the call;

determining whether the call satisfies a preset call processing condition according to the multimedia data from the calling subscriber; and processing the call if the call processing condition is satisfied.

According to another example aspect of the embodiments of the present application, a call processing apparatus is provided, comprising:

an acquiring module, configured to acquire multimedia data from a calling subscriber before a call ends, where the calling subscriber is a subscriber that initiates the call;

a determining module, configured to determine whether the call satisfies a preset call processing condition according to the multimedia data from the calling subscriber; and a processing module, configured to process the call if the call processing condition is satisfied.

At least one technical solution of the foregoing multiple technical solutions has the following example non-limiting beneficial effect:

The embodiments of the present application provide a call processing solution, in which multimedia data is acquired from a calling subscriber before a call ends; it is determined whether the call satisfies a preset call processing condition according to the multimedia data from the calling subscriber; and the call is processed if the call processing condition is satisfied. The embodiments of the present application may help to avoid missing important calls to an extent through the set call processing condition.

BRIEF DESCRIPTION OF THE DRAWINGS

FIG. 2b is an example structural diagram relating to the example embodiment shown in FIG. 2a;

FIG. 2c is an example structural diagram relating to the example embodiment shown in FIG. 2a;

FIG. 2d is another example structural diagram relating to the embodiment shown in FIG. 2a;

FIG. 2e is another structural diagram relating to the embodiment shown in FIG. 2a.

DETAILED DESCRIPTION

Embodiments of the present application are further described in detail hereinafter with reference to the accompanying drawings and embodiments. The following embodiments are intended to describe the present application, but not to limit the scope of the present application.

Figure 1:
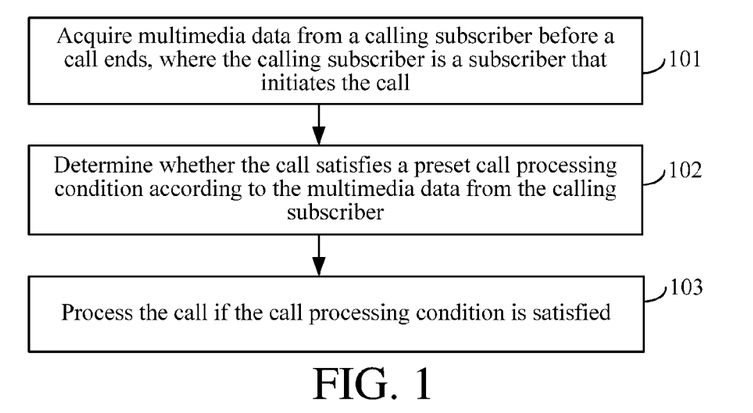
FIG. 1 is an example flowchart of an embodiment of a call processing method provided in the present application.

FIG. 1 is a flowchart of an embodiment of a call processing method provided in the present application. As shown in 1, this embodiment comprises:

101. Acquire multimedia data from a calling subscriber before a call ends, where the calling subscriber is a subscriber that initiates the call.

Generally, the calling subscriber uses a terminal of the calling subscriber to dial a phone number of a called subscriber and initiates a call to the called subscriber. In this embodiment, the terminal of the calling subscriber is referred to as a calling terminal, and a terminal corresponding to the phone number of the called subscriber is referred to as a called terminal.

The "call" in this embodiment refers to a process that is initiated by the calling subscriber by using the calling terminal to attempt to establish a communication link between the calling terminal and the called terminal. Generally, in a case in which the called terminal answers the call or the called terminal hangs up (for example, refuses to pick up) or the calling terminal hangs up, the call ends. Accordingly, the called terminal answers the call initiated by the calling subscriber, that is, the called terminal establishes the communication link to the calling terminal. For example, a calling subscriber initiates a call to a called subscriber by using a calling terminal, and if the called subscriber wants to pick up the phone, the called subscriber may click a button "Pick up" on a called terminal. Accordingly, the called terminal sends signaling for answering the call and establishes a communication link to the calling terminal. After the communication link is established, the called subscriber and the calling subscriber can make a conversation based on the communication link, and the conversation may be a voice and/or video conversation.

Optionally, the multimedia data comprises at least one of the following: sound data, image data, and text data, wherein the image data may be still image data or moving image data, for example, video data.

Optionally, the multimedia data from the calling subscriber is stored in a multimedia mailbox of the called subscriber of the call, where the multimedia mailbox may comprise at least one of the following: a voice mailbox, an image mailbox, and a text mailbox.

For example, a call processing apparatus executes Steps 101 to 103 in this embodiment. Specifically, the call processing apparatus may be located at a terminal side, for example, the call processing apparatus is disposed as a module in a called terminal or is the called terminal itself; or the call processing apparatus may be located at a network side, for example, the call processing apparatus is disposed as a module in a server deployed by a service provider providing a multimedia mailbox or is the server itself.

Optionally, the acquiring multimedia data from a calling subscriber comprises: acquiring, from a multimedia mailbox of the called subscriber, the multimedia data from the calling subscriber. For example, a calling subscriber dials a phone number of a called subscriber, and the called subscriber does not pick up within a period of time, so that the calling subscriber accesses a multimedia mailbox of the called subscriber to leave a message, and a call processing apparatus acquires the message from the multimedia mailbox of the called subscriber. Further, the acquiring, by a call processing apparatus, the message from the multimedia mailbox of the called subscriber may be a real-time process, that is, the call processing apparatus acquires the message from the multimedia mailbox of the called subscriber during a process when the calling subscriber leaves the message.

102. Determine whether the call satisfies a preset call processing condition according to the multimedia data from the calling subscriber.

In an optional embodiment, the call processing condition comprises at least one first keyword.

The determining whether the call satisfies a preset call processing condition according to the multimedia data from the calling subscriber comprises:

determining whether the multimedia data matches the at least one first keyword according to the multimedia data from the calling subscriber.

For example, the first keyword may be "emergency", "help", and the like. Specifically, the determining whether the multimedia data matches the at least one first keyword comprises: determining whether the multimedia data matches one of the at least one first keyword or determining whether the multimedia data matches all of the at least one first keyword.

Optionally, for text data from the calling subscriber, it can be determined whether the text data matches the at least one first keyword according to whether the text data comprises one or all of the at least one first keyword, or whether a degree of correlation between the text data and one or all of the at least one first keyword exceeds a preset threshold. For sound data from the calling subscriber, the sound data can be converted into text data, and then it is determined whether the sound data matches the at least one first keyword according to whether the text data obtained by conversion comprises one or all of the at least one first keyword, or whether a degree of correlation between the text data obtained by conversion and one or all of the at least one first keyword exceeds a preset threshold. For image data from the calling subscriber, a semantic analysis can be performed on the image data, and then it is determined whether the image data matches the at least one first keyword according to whether a semantic description obtained by analysis comprises one or all of the at least one first keyword, or whether a degree of correlation between the semantic description and one or all of the at least one first keyword exceeds a preset threshold.

In another optional embodiment, the call processing condition comprises at least one first emotion type.

The determining whether the call satisfies a preset call processing condition according to the multimedia data from the calling subscriber comprises:

determining an emotion type of the calling subscriber according to the multimedia data from the calling subscriber; and determining whether the emotion type of the calling subscriber matches the at least one first emotion type.

Specifically, the emotion type may be categorized in multiple manners. For example, an emotion type may comprise, but is not limited to, one of the following types: happiness, sadness, anger, calmness, nervousness, excitation, concentration, confusion, and the like.

Specifically, the emotion type of the calling subscriber may be determined according to the multimedia data from the calling subscriber in multiple manners, which are not limited in this embodiment. For example, for sound data, an emotion type expressed in the sound data can be determined according to the tone and pitch in the sound data.

Optionally, if an emotion type same as that of the calling subscriber exists in the at least one first emotion type, it is determined that the emotion type of the calling subscriber matches the at least one first emotion type.

Because different people may have different multimedia expression habits, optionally, the determining an emotion type of the calling subscriber according to the multimedia data from the calling subscriber comprises:

determining the emotion type of the calling subscriber according to the multimedia data from the calling subscriber and historical multimedia data from the calling subscriber.

The historical multimedia data from the calling subscriber may be acquired from the multimedia mailbox of the called subscriber, and accordingly every piece of multimedia data in the multimedia mailbox of the called subscriber is identified with a source of multimedia data, that is, which subscriber the piece of multimedia data comes from.

For example, if a subscriber A usually talks on the phone in a loud voice and a subscriber B usually talks on the phone in a low voice, it can be determined that an emotion type of the subscriber B is normal when sound data from the subscriber B indicates a low voice of the subscriber B and it can be determined that an emotion type of the subscriber B is happiness or anger when sound data from the subscriber B indicates a loud voice of the subscriber B; and it can be determined that an emotion type of the subscriber A is normal when sound data from the subscriber A indicates a loud voice of the subscriber A and it can be determined that an emotion type of the subscriber A is sadness when sound data from the subscriber A indicates a low voice of the subscriber A.

It should be noted that the emotion type of the calling subscriber may also be determined according to a habitual attribute of the calling subscriber and the multimedia data from the calling subscriber, where the habitual attribute of the calling subscriber may be preset by the called subscriber according to experience of conversations with the calling subscriber or obtained based on analysis of the historical multimedia data of the calling subscriber.

In another optional embodiment, the call processing condition comprises at least one first emotion type and at least one first emotion level.

The determining whether the call satisfies a preset call processing condition according to the multimedia data from the calling subscriber comprises:

determining an emotion type and an emotion level of the calling subscriber according to the multimedia data from the calling subscriber; and determining whether the emotion type and the emotion level of the calling subscriber respectively match the at least one first emotion type and the at least one first emotion level.

The at least one first emotion level corresponds to the at least one first emotion type, and each of the first emotion types may have at least one corresponding first emotion level. Specifically, the emotion type may be categorized in multiple manners. For example, an emotion type may comprise, but is not limited to, one of the following types: happiness, sadness, anger, calmness, nervousness, excitation, concentration, confusion, and the like.

Specifically, the emotion type and the emotion level of the calling subscriber may be determined according to the multimedia data from the calling subscriber in multiple manners, which are not limited in this embodiment. For example, for sound data, an emotion type and an emotion level expressed in the sound data can be determined according to the tone and pitch in the sound data.

Optionally, if an emotion type same as that of the calling subscriber exists in the at least one first emotion type, and an emotion level same as that of the calling subscriber exists in at least one emotion level corresponding to a first emotion type same as the emotion type of the calling subscriber, or the corresponding at least one emotion level is not higher than the emotion level of the calling subscriber, it is determined that the emotion type and the emotion level of the calling subscriber respectively match the at least one first emotion type and the at least one first emotion level. For example, a first emotion type is anger and a first emotion level is a second level, and then when an emotion type of the calling subscriber is anger and an emotion level of the calling subscriber is not lower than the second level, it is determined that the call satisfies the preset call processing condition.

Because different people may have different multimedia expression habits, optionally, the determining an emotion type and an emotion level of the calling subscriber according to the multimedia data from the calling subscriber comprises:

determining the emotion type and emotion level of the calling subscriber according to the multimedia data from the calling subscriber and historical multimedia data from the calling subscriber.

In any embodiment, optionally, the call processing condition is set by the called subscriber of the call for the calling subscriber. Specifically, the called subscriber may set a corresponding call processing condition for at least one contact in an address book of a called terminal. For example, for a subscriber A, a subscriber B is a supervisor of the subscriber A at work, and a subscriber C is a family member of the subscriber A. The subscriber A can set a call processing condition for the subscriber B, where the call processing condition comprises a keyword "emergency", and accordingly when the subscriber B calls the subscriber A, multimedia data from the subscriber B matches the keyword "emergency", and then it is determined that the call satisfies the preset call processing condition corresponding to the subscriber B. The subscriber A can set another call processing condition for the subscriber C, where the call processing condition comprises an emotion type "sadness", and accordingly when the subscriber C calls the subscriber A, multimedia data from the subscriber C indicates that an emotion type of the subscriber C matches "sadness", and then it is determined that the call satisfies the preset call processing condition corresponding to the subscriber C.

It should be noted that the called subscriber in this embodiment may also set a general call processing condition for all contacts. Optionally, the called subscriber may also set a general call processing condition for a contact other than those in the address book, that is, an unknown contact.

103. Process the call if the call processing condition is satisfied.

In an optional embodiment, the processing the call comprises:

controlling the called terminal to answer the call.

Specifically, the called terminal is controlled to answer the call, that is, the called terminal is controlled to automatically answer the call, which is equivalent to that a button "Pick up" is automatically clicked and the communication link to the calling terminal is established.

In order to provide the called subscriber with a certain buffer time, optionally, the controlling the called terminal to answer the call comprises:

controlling the called terminal to answer the call after a preset time interval.

The time interval may be preset by the called subscriber, for example, the time interval is preset to 3 seconds or 5 seconds. Further, the called subscriber may further be prompted during the time interval. For example, when it is determined that the call satisfies the preset call processing condition, the called terminal is controlled to play a voice prompt "An important call is about to be automatically established in 3 seconds".

In an actual scenario, while the call is originated, the called terminal may be in an idle state or may also be in a busy state, that is, the called subscriber is during a conversation with another subscriber. Accordingly, if the called terminal is in a busy state, while the called terminal is controlled to answer the call, the conversation with the another subscriber can also be hold on. For example, the conversation is set to a waiting state, and when a conversation between the called subscriber and the calling subscriber ends, the conversation with the another subscriber is restored.

In another optional embodiment, the processing the call comprises:

prompting the called subscriber of the call to answer the call.

Specifically, the prompting may be implemented through the called terminal. Further, there are multiple manners of prompting, by the called terminal, the called subscriber of the call to answer the call.

Optionally, the prompting the called subscriber of the call to answer the call comprises:

if the called terminal is in a mute state, canceling the mute state of the called terminal.

Specifically, because the called terminal is in the mute state, during the call, the called terminal does not ring. Accordingly, after the mute state of the called terminal is canceled, the called terminal may start ringing or playing a specific prompt to draw attention of the called subscriber.

Optionally, the prompting the called subscriber of the call to answer the call comprises:

controlling the called terminal to play the multimedia data.

Alternatively, the called terminal may further be controlled to play other pieces of prompt information, for example, "An important call. Please pick up".

In a possible scenario, when it is determined that the call satisfies the preset call processing condition, one of the foregoing embodiments can be chosen, that is, the called subscriber is prompted to answer the call or the called terminal automatically answers the call.

In another possible scenario, the foregoing embodiments correspond to different call processing conditions. In response to it is determined that the call satisfies a call processing condition, an embodiment corresponding to the call processing condition is implemented. For example, a call processing condition corresponding to an embodiment of automatically answering comprises an emotion type "anger" and an emotion level "second level", and a call processing condition corresponding to an embodiment of prompting a called subscriber to answer comprises an emotion type "anger" and an emotion level "first level". If it is determined that an emotion type of the calling subscriber is "anger", and an emotion level of the calling subscriber is "second level", the embodiment of automatically answering may be used; and if it is determined that an emotion type of the calling subscriber is "anger", and an emotion level of the calling subscriber is "first level", the embodiment of prompting a called subscriber to answer may be used.

To establish the communication link to the calling terminal when the called terminal answers the call, optionally, the method further comprises:

prompting the calling subscriber to hold on if the call satisfies the call processing condition.

For example, in a scenario in which the calling subscriber accesses a voice mailbox of the called subscriber, while the calling subscriber leaves a message, if a call processing apparatus determines that the call satisfies the call processing condition, the call processing apparatus prompts the calling subscriber to hold on. Accordingly, the calling subscriber may wait a while instead of directly hanging up after completing the message, and during a subsequent process that the calling subscriber continues the message or waits, the call processing apparatus may automatically answer the call or the called subscriber may actively answer the call based on the prompting by the call processing apparatus.

This embodiment provides a call processing solution, in which multimedia data is acquired from a calling subscriber before a call ends; it is determined whether the call satisfies a preset call processing condition according to the multimedia data from the calling subscriber; and the call is processed if the call processing condition is satisfied. This embodiment may help to avoid missing important calls to an extent through the set call processing condition.

Figure 2A:
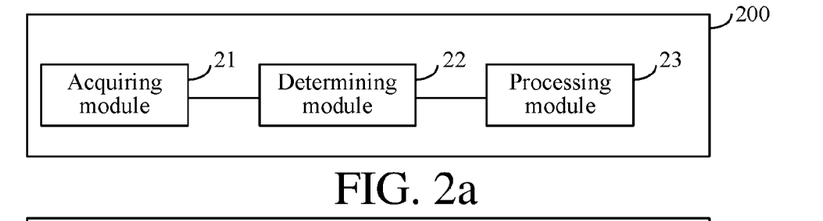
FIG. 2a is an example structural diagram of a first embodiment of a call processing apparatus provided in the present application.

FIG. 2a is a structural diagram of Embodiment 1 of a call processing apparatus provided in the present application. As shown in FIG. 2a, an apparatus 200 comprises:

an acquiring module 21, configured to acquire multimedia data from a calling subscriber before a call ends, where the calling subscriber is a subscriber that initiates the call;

a determining module 22, configured to determine whether the call satisfies a preset call processing condition according to the multimedia data from the calling subscriber; and a processing module 23, configured to process the call if the call processing condition is satisfied.

Generally, the calling subscriber uses a terminal of the calling subscriber to dial a phone number of a called subscriber and initiates a call to the called subscriber. In this embodiment, the terminal of the calling subscriber is referred to as a calling terminal, and a terminal corresponding to the phone number of the called subscriber is referred to as a called terminal.

The "call" in this embodiment refers to a process that is initiated by the calling subscriber by using the calling terminal to attempt to establish a communication link between the calling terminal and the called terminal. Generally, in a case in which the called terminal answers the call or the called terminal hangs up (for example, refuses to pick up) or the calling terminal hangs up, the call ends. Accordingly, the called terminal answers the call initiated by the calling subscriber, that is, the called terminal establishes the communication link to the calling terminal. For example, a calling subscriber initiates a call to a called subscriber by using a calling terminal, and if the called subscriber wants to pick up the phone, the called subscriber may click a button "Pick up" on a called terminal. Accordingly, the called terminal sends signaling for answering the call and establishes a communication link to the calling terminal. After the communication link is established, the called subscriber and the calling subscriber can make a conversation based on the communication link, and the conversation may be a voice and/or video conversation.

Optionally, the multimedia data comprises at least one of the following: sound data, image data, and text data, where the image data may be still image data or moving image data, for example, video data.

Optionally, the multimedia data from the calling subscriber is stored in a multimedia mailbox of the called subscriber of the call, where the multimedia mailbox may comprise at least one of the following: a voice mailbox, an image mailbox, and a text mailbox.

It should be noted that, the apparatus 200 in this embodiment may be located at a terminal side, for example, the apparatus 200 is disposed as a module in the called terminal or is the called terminal itself; or the apparatus 200 may be located at a network side, for example, the apparatus 200 is disposed as a module in a server deployed by a service provider providing a multimedia mailbox or is the server itself.

Optionally, the acquiring module 21 is specifically configured to: acquire, from the multimedia mailbox of the called subscriber, the multimedia data from the calling subscriber. For example, a calling subscriber dials a phone number of a called subscriber, and the called subscriber does not pick up within a period of time, so that the calling subscriber accesses a multimedia mailbox of the called subscriber to leave a message, and the acquiring module 21 acquires the message from the multimedia mailbox of the called subscriber. Further, the acquiring, by the acquiring module 21, the message from the multimedia mailbox of the called subscriber may be a real-time process, that is, the acquiring module 21 acquires the message from the multimedia mailbox of the called subscriber during a process when the calling subscriber leaves the message.

In an optional embodiment, the call processing condition comprises a first keyword;

The determining module 22 is specifically configured to: determine whether the multimedia data matches the at least one first keyword according to the multimedia data from the calling subscriber.

For example, the first keyword may be "emergency", "help", and the like. Specifically, the determining module 22 is specifically configured to: determine whether the multimedia data matches one of the at least one first keyword or determine whether the multimedia data matches all of the at least one first keyword.

Optionally, for text data from the calling subscriber, the determining module 22 can determine whether the text data matches the at least one first keyword according to whether the text data comprises one or all of the at least one first keyword, or whether a degree of correlation between the text data and one or all of the at least one first keyword exceeds a preset threshold. For sound data from the calling subscriber, the determining module 22 can convert the sound data into text data, and then determine whether the sound data matches the at least one first keyword according to whether the text data obtained by conversion comprises one or all of the at least one first keyword, or whether a degree of correlation between the text data obtained by conversion and one or all of the at least one first keyword exceeds a preset threshold. For image data from the calling subscriber, the determining module 22 can make a semantic analysis on the image data, and then determine whether the image data matches the at least one first keyword according to whether a semantic description obtained by analysis comprises one or all of the at least one first keyword, or whether a degree of correlation between the semantic description and one or all of the at least one first keyword exceeds a preset threshold.

Figure 2B:
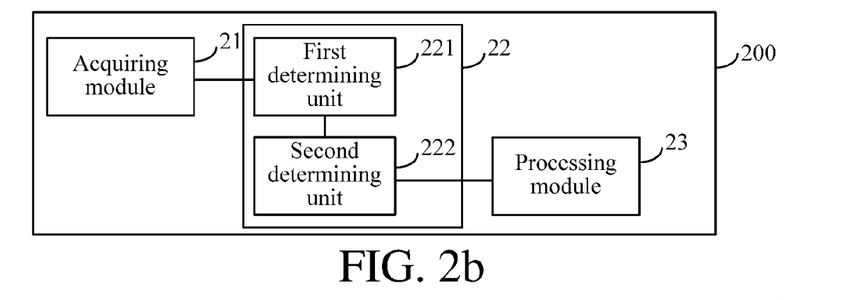

In another optional embodiment, the call processing condition comprises at least one first emotion type. As shown in FIG. 2b, the determining module 22 comprises:

a first determining unit 221, configured to determine an emotion type of the calling subscriber according to the multimedia data from the calling subscriber; and a second determining unit 222, configured to determine whether the emotion type of the calling subscriber matches the at least one first emotion type.

Specifically, the emotion type may be categorized in multiple manners. For example, an emotion type may comprise, but is not limited to, one of the following types: happiness, sadness, anger, calmness, nervousness, excitation, concentration, confusion, and the like.

Specifically, the first determining unit 221 may determine the emotion type of the calling subscriber in multiple manners, which are not limited in this embodiment. For example, for sound data, the first determining unit 221 can determine an emotion type expressed in the sound data according to the tone and pitch in the sound data.

Optionally, if an emotion type same as that of the calling subscriber exists in the at least one first emotion type, the second determining unit 222 determines that the emotion type of the calling subscriber matches the at least one first emotion type.

Because different people may have different multimedia expression habits, optionally, the first determining unit 221 is specifically configured to: determine the emotion type of the calling subscriber according to the multimedia data from the calling subscriber and historical multimedia data from the calling subscriber.

The historical multimedia data from the calling subscriber may be acquired from the multimedia mailbox of the called subscriber, and accordingly every piece of multimedia data in the multimedia mailbox of the called subscriber is identified with a source of multimedia data, that is, which subscriber the piece of multimedia data comes from.

For example, if a subscriber A usually talks on the phone in a loud voice and a subscriber B usually talks on the phone in a low voice, the first determining unit 221 can determine that an emotion type of the subscriber B is normal when sound data from the subscriber B indicates a low voice of the subscriber B and the first determining unit 221 can determine that an emotion type of the subscriber B is happiness or anger when sound data from the subscriber B indicates a loud voice of the subscriber B; and the first determining unit 221 can determine that an emotion type of the subscriber A is normal when sound data from the subscriber A indicates a loud voice of the subscriber A and the first determining unit 221 can determine that an emotion type of the subscriber A is sadness when sound data from the subscriber A indicates a low voice of the subscriber A.

It should be noted that the first determining unit 221 may further determine the emotion type of the calling subscriber according to a habitual attribute of the calling subscriber and the multimedia data from the calling subscriber, where the habitual attribute of the calling subscriber may be preset by the called subscriber according to experience of conversations with the calling subscriber or obtained based on analysis of the historical multimedia data of the calling subscriber.

In another optional embodiment, the call processing condition comprises at least one first emotion type and at least one first emotion level.

The determining module 22 is further configured to:

determine an emotion type and an emotion level of the calling subscriber according to the multimedia data from the calling subscriber; and determine whether the emotion type and the emotion level of the calling subscriber respectively match the at least one first emotion type and the at least one first emotion level.

The at least one first emotion level corresponds to the at least one first emotion type, and each of the first emotion types may have at least one corresponding first emotion level. Specifically, the emotion type may be categorized in multiple manners. For example, an emotion type may comprise, but is not limited to, one of the following types: happiness, sadness, anger, calmness, nervousness, excitation, concentration, confusion, and the like.

Specifically, the determining module 22 may determine the emotion type and the emotion level of the calling subscriber according to the multimedia data from the calling subscriber in multiple manners, which are not limited in this embodiment. For example, for sound data, the determining module 22 can determine an emotion type and an emotion level expressed in the sound data according to the tone and pitch in the sound data.

Optionally, if an emotion type same as that of the calling subscriber exists in the at least one first emotion type, and an emotion level same as that of the calling subscriber exists in at least one emotion level corresponding to a first emotion type same as the emotion type of the calling subscriber, or the corresponding at least one emotion level is not higher than the emotion level of the calling subscriber, the determining module 22 determines that the emotion type and the emotion level of the calling subscriber respectively match the at least one first emotion type and the at least one first emotion level. For example, a first emotion type is anger and a first emotion level is a second level, and then when an emotion type of the calling subscriber is anger and an emotion level of the calling subscriber is not lower than the second level, the determining module 22 determines that the call satisfies the preset call processing condition.

Because different people may have different multimedia expression habits, optionally, the determining an emotion type and an emotion level of the calling subscriber according to the multimedia data from the calling subscriber comprises:

determining the emotion type and emotion level of the calling subscriber according to the multimedia data from the calling subscriber and historical multimedia data from the calling subscriber.

In any embodiment, optionally, the call processing condition is set by the called subscriber of the call for the calling subscriber. Specifically, the called subscriber may set a corresponding call processing condition for at least one contact in an address book of a called terminal. For example, for a subscriber A, a subscriber B is a supervisor of the subscriber A at work, and a subscriber C is a family member of the subscriber A. The subscriber A can set a call processing condition for the subscriber B, where the call processing condition comprises a keyword "emergency", and accordingly when the subscriber B calls the subscriber A, multimedia data from the subscriber B matches the keyword "emergency", and then the determining module 22 determines that the call satisfies the preset call processing condition corresponding to the subscriber B. The subscriber A can set another call processing condition for the subscriber C, where the call processing condition comprises an emotion type "sadness", and accordingly when the subscriber C calls the subscriber A, multimedia data from the subscriber C indicates that an emotion type of the subscriber C matches "sadness", and then the determining module 22 determines that the call satisfies the preset call processing condition corresponding to the subscriber C.

It should be noted that the called subscriber in this embodiment may also set a general call processing condition for all contacts. Optionally, the called subscriber may also set a general call processing condition for a contact other than those in the address book, that is, an unknown contact.

Figure 2C:
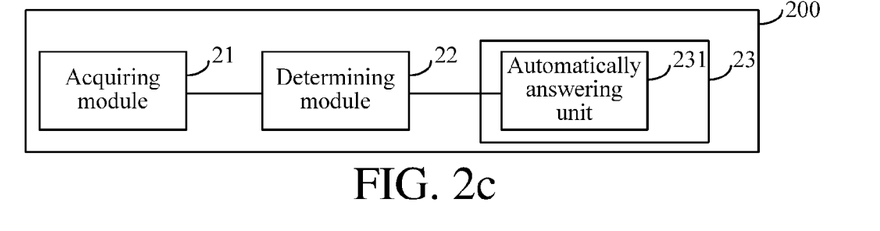

In an optional embodiment, as shown in FIG. 2c, the processing module 23 comprises:

an automatically answering unit 231, configured to, if the call processing condition is satisfied, control the called terminal to answer the call.

Specifically, the automatically answering unit 231 controls the called terminal to answer the call, that is, the automatically answering unit 231 controls the called terminal to automatically answer the call, which is equivalent to that a button "Pick up" is automatically clicked and the communication link to the calling terminal is established.

In order to provide the called subscriber with a certain buffer time, optionally, the automatically answering unit 231 is further configured to:

if the call processing condition is satisfied, control the called terminal to answer the call after a preset time interval.

The time interval may be preset by the called subscriber, for example, the time interval is preset to 3 seconds and 5 seconds. Further, the automatically answering unit 231 may further prompt the called subscriber during the time interval. For example, when the determining module 22 determines that the call satisfies the preset call processing condition, the automatically answering unit 231 controls the called terminal to play a voice prompt "An important call is about to be automatically established in 3 seconds".

In an actual scenario, while the call is originated, the called terminal may be in an idle state or may also be in a busy state, that is, the called subscriber is during a conversation with another subscriber. Accordingly, if the called terminal is in a busy state, while the called terminal is controlled to answer the call, the automatically answering unit 231 can also hold on the conversation with the another subscriber. For example, the conversation is set to a waiting state, and when a conversation between the called subscriber and the calling subscriber ends, the automatically answering unit 231 restores the conversation with the another subscriber.

Figure 2D:
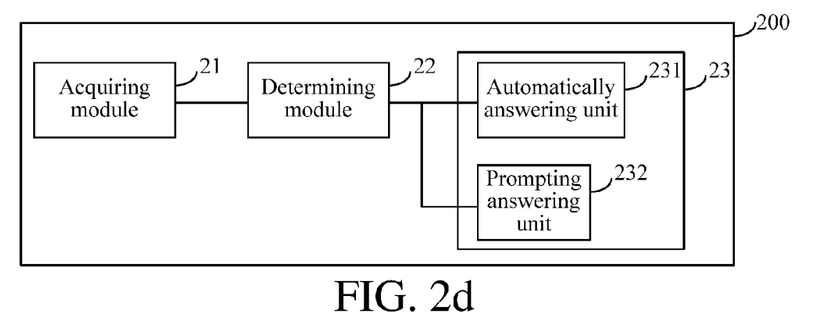

In another optional embodiment, as shown in FIG. 2d, the processing module 23 comprises:

a prompting answering unit 232, configured to: if the call processing condition is satisfied, prompt the called subscriber of the call to answer the call.

Specifically, the prompting answering unit 232 may prompt the called subscriber through the called terminal. Further, there are multiple manners in which the prompting answering unit 232 prompts, through the called terminal, the called subscriber of the call to answer the call.

Optionally, the prompting answering unit 232 is further configured to:

if the call processing condition is satisfied and the called terminal is in a mute state, cancel the mute state of the called terminal.

Specifically, because the called terminal is in the mute state, during the call, the called terminal does not ring. Accordingly, after the prompting answering unit 232 cancels the mute state of the called terminal, the called terminal may start ringing or playing a specific prompt to draw attention of the called subscriber.

Optionally, the prompting answering unit 232 is further configured to:

if the call processing condition is satisfied, control the called terminal to play the multimedia data.

Alternatively, the prompting answering unit 232 can further control the called terminal to play another prompt information, for example, "An important call. Please pick up".

In a possible scenario, when it is determined that the call satisfies the preset call processing condition, one of the automatically answering unit 231 and the prompting answering unit 232 may be chosen to be triggered, that is, the called subscriber is prompted to answer the call or the called terminal automatically answers the call.

In another possible scenario, the foregoing automatically answering unit 231 and the prompting answering unit 232 correspond to different call processing conditions. In response to the determining module 22 determines that the call satisfies a call processing condition, the unit corresponding to the call processing condition is triggered. For example, a call processing condition corresponding to the automatically answering unit 231 comprises an emotion type "anger" and an emotion level "second level", and a call processing condition corresponding to the prompting answering unit 232 comprises an emotion type "anger" and an emotion level "first level". If the determining module 22 determines that an emotion type of the calling subscriber is "anger", and an emotion level of the calling subscriber is "second level", the automatically answering unit 231 may be triggered; and if it is determined that an emotion type of the calling subscriber is "anger", and an emotion level of the calling subscriber is "first level", the prompting answering unit 232 can be triggered.

Figure 2E:
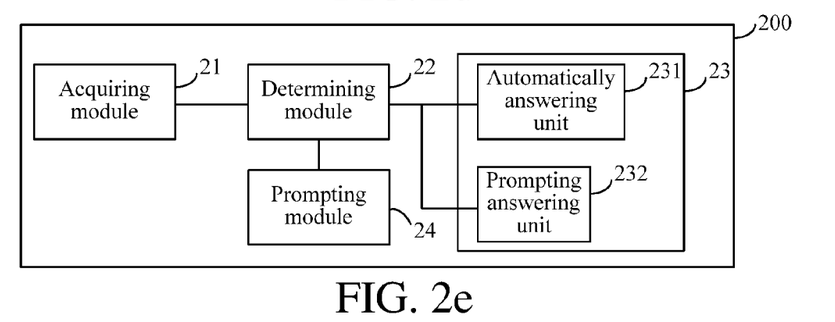

To establish the communication link to the calling terminal when the called terminal answers the call, optionally, as shown in FIG. 2e, the apparatus 200 further comprises:

a prompting module 24, configured to prompt the calling subscriber to hold on if the call satisfies the call processing condition.

For example, in a scenario in which the calling subscriber accesses a voice mailbox of the called subscriber, while the calling subscriber leaves a message, if the determining module 22 determines the call satisfies the call processing condition, the prompting module 24 prompts the calling subscriber to hold on. Accordingly, the calling subscriber may wait a while instead of directly hanging up after completing the message, and during a subsequent process that the calling subscriber continues the message or waits, the automatically answering unit 231 may automatically answer the call or the called subscriber may actively answer the call based on the prompting by the prompting answering unit 232.

The call processing apparatus in this embodiment provides a call processing solution, in which multimedia data is acquired from a calling subscriber before a call ends; it is determined whether the call satisfies a preset call processing condition according to the multimedia data from the calling subscriber; and the call is processed if the call processing condition is satisfied. This embodiment may help to avoid missing important calls to an extent through the set call processing condition.

Figure 3:
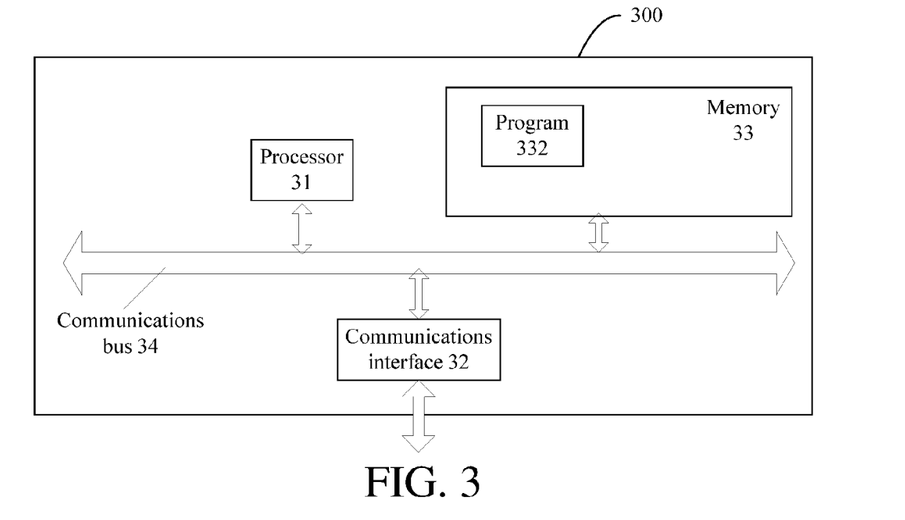
FIG. 3 is an example structural diagram of another embodiment of a call processing apparatus provided in the present application.

FIG. 3 is a structural diagram of Embodiment 2 of a call processing apparatus provided in the present application. As shown in FIG. 3, an apparatus 300 comprises:

a processor 31, a communications interface 32, a memory 33, and a communications bus 34, where:

the processor 31, the communications interface 32, and the memory 33 accomplish communication with each other by using the communications bus 34.

The communications interface 32 is configured to communicate with an external device such as a subscriber terminal.

The processor 31 is configured to execute a program 332. Specifically, the processor 31 may perform related steps in the forgoing Embodiment 1 of the method.

Specifically, the program 332 may comprise program code, where the program code comprises a computer operation instruction.

The processor 31 may be a central processing unit (CPU), an application specific integrated circuit (ASIC), or one or more integrated circuits configured to implement this embodiment of the present application.

The memory 33 is configured to store the program 332. The memory 33 may comprise a high-speed random access memory (RAM) memory, and may also comprise a nonvolatile memory such as at least one disk memory. The program 332 may be specifically configured to cause the apparatus 300 to perform the following steps:

acquiring multimedia data from a calling subscriber before a call ends, where the calling subscriber is a subscriber that initiates the call;

determining whether the call satisfies a preset call processing condition according to the multimedia data from the calling subscriber; and processing the call if the call processing condition is satisfied.

Reference may be made to corresponding description of corresponding steps in the forgoing method embodiment and units for the specific implementation of the steps in the program 332, which are not described again herein. It may be clearly understood by a person skilled in the art that, for convenience and simplicity of description, reference may be made to the description of corresponding processes in the foregoing method embodiment for detailed working processes of the devices and modules described above, which are not described again herein.

It can be realized by a person of ordinary skill in the art that, units and method steps described with reference to the embodiments disclosed in this specification can be implemented by electronic hardware or a combination of computer software and electronic hardware. Whether these functions are actually executed in a hardware or software form depends on specific applications and design constraints of the technical solution. A person skilled in the art may use different methods to implement the described function for each specific application, but such implementation should not be considered beyond the scope of the present application.

If the function is implemented in a form of a software functional unit and is sold or used as an independent product, the product can be stored in a computer-readable storage medium. Based on this understanding, the technical solution of the present application essentially, or a part, of the technical solution, that contributes to the prior art, or a part of the technical solution may be embodied in a form of a software product; the computer software product is stored in a storage medium and comprises a number of instructions that enable a computer device (which may be a personal computer, a server, a network device, or the like) to execute all or some of the steps of the method in the embodiments of the present application. The foregoing storage medium comprises various media that can store program code, such as a USB flash drive, a mobile hard disk, a read-only memory (ROM), a RAM, a magnetic disk, or a compact disc.

The above embodiments are only configured to describe the present application rather than to limit the present application; various changes and variations may be made by those of ordinary skill in the art without departing from the spirit and scope of the present application, so all equivalent technical solutions also belong to the scope of the present application, and the protection scope of the present application should be as defined by claims.

What is claimed is:

1. A method, comprising:
acquiring, by a device comprising a processor, multimedia data associated with a calling subscriber identity before a call ends, wherein the calling subscriber identity identifies a subscriber that initiates the call;
determining whether the call satisfies a preset call processing condition according to the multimedia data from the calling subscriber identity; and
processing the call in response to determining that the call processing condition is satisfied, wherein:
the call processing condition comprises at least one first emotion type; and
the determining whether the call satisfies the preset call processing condition according to the multimedia data from the calling subscriber identity comprises:
determining an emotion type of the calling subscriber identity according to the multimedia data from the calling subscriber identity; and determining whether the emotion type of the calling subscriber identity matches the at least one first emotion type.

2. The method of claim 1, wherein the multimedia data from the calling subscriber identity is stored in a multimedia mailbox of a called subscriber identity of the call.

3. The method of claim 1, wherein the call processing condition further comprises at least one first keyword, and the determining whether the call satisfies the preset call processing condition according to the multimedia data from the calling subscriber identity further comprises:
determining whether the multimedia data matches the at least one first keyword according to the multimedia data from the calling subscriber identity.

4. The method of claim 1, wherein the determining the emotion type comprises:
determining the emotion type of the calling subscriber identity according to the multimedia data from the calling subscriber identity and historical multimedia data from the calling subscriber identity.

5. The method of claim 1, wherein the call processing condition further comprises at least one first emotion level; and
the determining an emotion type of the calling subscriber identity according to the multimedia data from the calling subscriber identity comprises:
determining an emotion type and an emotion level of the calling subscriber identity according to the multimedia data from the calling subscriber identity; and
the determining whether the emotion type of the calling subscriber identity matches the at least one first emotion type comprises determining whether the emotion type and the emotion level of the calling subscriber identity respectively match the at least one first emotion type and the at least one first emotion level.

6. The method of claim 1, wherein the call processing condition is set by a called subscriber identity of the call for the calling subscriber identity.

7. The method of claim 1, wherein the processing the call comprises:
controlling a called terminal to answer the call.

8. The method of claim 7, wherein the controlling the called terminal to answer the call comprises:
controlling the called terminal to answer the call after a preset time interval.

9. The method of claim 1, wherein the processing the call comprises:
prompting a called subscriber identity of the call to answer the call.

10. The method of claim 9, wherein the prompting the called subscriber identity of the call to answer the call comprises:
in response to determining that a called terminal is in a mute state, canceling the mute state of the called terminal.

11. The method of claim 9, wherein the prompting the called subscriber identity of the call to answer the call comprises:
controlling a called terminal to play the multimedia data.

12. The method according to any one of claim 1, further comprising:
prompting the calling subscriber identity to hold on in response to determining that the call satisfies the call processing condition.

13. The method of claim 1, wherein the multimedia data comprises at least one of sound data, image data, or text data.

14. An apparatus, comprising:
a processor, coupled to a memory, that executes or facilitates execution of executable modules, comprising:
an acquiring module configured to acquire multimedia data associated with a calling subscriber before a call ends, wherein the calling subscriber initiates the call;
a determining module configured to determine whether the call satisfies a preset call processing condition according to the multimedia data from the calling subscriber; and
a processing module configured to process the call if the call processing condition is satisfied, wherein the call processing condition comprises at least one first emotion type, and wherein the determining module comprises:
a first determining unit configured to determine an emotion type of the calling subscriber according to the multimedia data from the calling subscriber; and
a second determining unit configured to determine whether the emotion type of the calling subscriber matches the at least one first emotion type.

15. The apparatus of claim 14, wherein the call processing condition further comprises at least one first keyword, and the determining module is further configured to determine whether the multimedia data matches the at least one first keyword according to the multimedia data from the calling subscriber.

16. The apparatus of claim 14, wherein the first determining unit is further configured to determine an emotion type of the calling subscriber according to the multimedia data from the calling subscriber and historical multimedia data from the calling subscriber.

17. The apparatus of claim 14, wherein the call processing condition further comprises at least one first emotion level;
the first determining unit is further configured to determine an emotion type and an emotion level of the calling subscriber according to the multimedia data from the calling subscriber; and
the second determining unit is further configured to determine whether the emotion type and the emotion level of the calling subscriber respectively match the at least one first emotion type and the at least one first emotion level.

18. The apparatus of claim 14, wherein the call processing condition is set by a called subscriber of the call for the calling subscriber.

19. The apparatus of claim 14, wherein the processing module comprises:
an automatically answering unit configured to control a called terminal to answer the call if the call processing condition is satisfied.

20. The apparatus of claim 19, wherein the automatically answering unit is further configured to:
if the call processing condition is satisfied, control the called terminal to answer the call after a preset time interval.

21. The apparatus of claim 14, wherein the processing module comprises:
a prompting answering unit configured to, if the call processing condition is satisfied, prompt a called subscriber of the call to answer the call.

22. The apparatus of claim 21, wherein the prompting answering unit is further configured to:
if the call processing condition is satisfied and a called terminal is in a mute state, cancel the mute state of the called terminal.

23. The apparatus of claim 21, wherein the prompting answering unit is further configured to:
  if the call processing condition is satisfied, control a called terminal to play the multimedia data.

24. The apparatus of claim 14, the executable modules further comprising:
  a prompting module configured to prompt the calling subscriber to hold on if the call satisfies the call processing condition.

25. A computer readable storage device comprising executable instructions that, in response to execution, cause a device comprising a processor to perform operations, comprising:
  acquiring multimedia data associated with a calling subscriber during a call, wherein the calling subscriber is a subscriber that initiates the call, and wherein the calling subscriber is associated with a calling subscriber identity; and
  in response to determining that the call satisfies a preset call processing condition according to the multimedia data from the calling subscriber, processing the call, wherein the preset call processing condition comprises at least one first emotion type, and wherein the determining whether the call satisfies the preset call processing condition according to the multimedia data from the calling subscriber identity comprises:
    determining an emotion type of the calling subscriber identity according to the multimedia data from the calling subscriber identity; and
    determining whether the emotion type of the calling subscriber identity matches the at least one first emotion type.

26. The computer readable storage device of claim 25, wherein the determining the emotion type comprises determining the emotion type of the calling subscriber identity according to the multimedia data corresponding to the calling subscriber identity and historical multimedia data corresponding to the calling subscriber identity.

27. The computer readable storage device of claim 25, wherein:
  the preset call processing condition further comprises at least one first emotion level;
  the determining the emotion type of the calling subscriber identity, according to the multimedia data from the calling subscriber identity, comprises determining an emotion type and determining an emotion level of the calling subscriber identity according to the multimedia data corresponding to the calling subscriber identity; and
  the determining whether the emotion type of the calling subscriber identity matches the at least one first emotion type comprises determining whether the emotion type and the emotion level of the calling subscriber identity respectively match the at least one first emotion type and the at least one first emotion level.

\* \* \* \* \*